United States Patent [19]
Sahay et al.

[11] Patent Number: 5,594,840
[45] Date of Patent: Jan. 14, 1997

[54] APPARATUS AND METHOD FOR DIAGNOSING THE OPERATION OF A PRINTING SYSTEM

[75] Inventors: Bharat B. Sahay, Fairport; Max C. Nowacki, Red Creek; Gregory J. Meteyer, Pittsford; Louis J. Cardinale, Webster, all of N.Y.

[73] Assignee: Xerox Corporation, Stamford, Conn.

[21] Appl. No.: 68,724

[22] Filed: May 26, 1993

[51] Int. Cl.⁶ .................................................. G06F 15/00
[52] U.S. Cl. ........................................ 395/113; 395/101
[58] Field of Search ............................. 395/110, 112, 395/117, 114, 115, 113, 101, 111; 358/400

[56] References Cited

U.S. PATENT DOCUMENTS

| | | | |
|---|---|---|---|
| 3,597,071 | 7/1971 | Jones | 355/3 |
| 3,920,895 | 11/1975 | Vieri et al. | 178/26 |
| 3,958,088 | 5/1976 | Vieri et al. | 178/26 |
| 4,623,244 | 11/1986 | Andrews et al. | 355/24 |
| 4,651,278 | 3/1987 | Herzog et al. | 364/300 |
| 4,899,136 | 2/1990 | Beard et al. | 340/706 |
| 4,937,036 | 6/1990 | Beard et al. | 340/706 |
| 4,939,507 | 7/1990 | Beard et al. | 340/706 |
| 4,947,345 | 8/1990 | Paradise et al. | 364/519 |
| 4,968,159 | 11/1990 | Sasaki et al. | 400/76 |
| 4,979,132 | 12/1990 | Sugimoto | 364/520 |
| 5,001,655 | 3/1991 | Higano et al. | 364/519 |
| 5,008,853 | 4/1991 | Bly et al. | 364/900 |
| 5,065,347 | 11/1991 | Pajak et al. | 395/159 |
| 5,072,412 | 12/1991 | Henderson, Jr. et al. | 395/159 |
| 5,113,355 | 5/1992 | Nomura | 395/109 |
| 5,113,517 | 5/1992 | Beard et al. | 364/200 |
| 5,119,473 | 6/1992 | Ikenoue | 395/115 |
| 5,133,048 | 7/1992 | Parsons et al. | 395/111 |
| 5,150,455 | 9/1992 | Morikawa et al. | 395/114 |
| 5,153,577 | 10/1992 | Mackey et al. | 340/793 |
| 5,170,340 | 12/1992 | Prokop et al. | 364/143 |
| 5,220,645 | 6/1993 | Nakajima | 395/113 |
| 5,222,200 | 6/1993 | Callister et al. | 395/112 |
| 5,226,112 | 7/1993 | Mensing et al. | 395/114 |
| 5,228,118 | 7/1993 | Sasaki | 395/112 |
| 5,262,872 | 11/1993 | Yoshimura et al. | 358/296 |
| 5,268,993 | 12/1993 | Ikenoue et al. | 395/114 |
| 5,293,466 | 3/1994 | Bringmann | 395/114 |
| 5,299,294 | 3/1994 | McCracken et al. | 395/110 |
| 5,307,501 | 4/1994 | Yuge | 395/800 |

*Primary Examiner*—Raymond J. Bayerl
*Assistant Examiner*—Steven P. Sax
*Attorney, Agent, or Firm*—Gary B. Cohen

[57] ABSTRACT

An apparatus for verifying the integrity of a printing system is provided. The apparatus includes an interpreter for converting an input image data file written in a first page description language into an output image data file written in a second page description language, and a comparator for comparing the output image data file with a reference output image data file.

8 Claims, 6 Drawing Sheets

APPARATUS AND METHOD FOR DIAGNOSING THE OPERATION OF A PRINTING SYSTEM

The present invention relates generally to a technique for verifying the integrity of various subsystems in a printing system.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to a personal computer ("PC"). However, printers used for this purpose are typically small laser printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom Printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

The following patents include examples of systems noting a network, server and printer [usually for shared users' remote terminals]:

U.S. Pat. No. 3,920,895
Patentee(s): Vieri et al.
issued: Nov. 18, 1975
U.S. Pat. No. 3,958,088
Patentee(s): Vieri et al.
Issued: May 18, 1976
U.S. Pat. No. 4,651,278
Patentee(s): Herzog et al.
Issued: Mar. 17, 1987
U.S. Pat. No. 4,899,136
Patentee(s): Beard et al.
issued: Feb. 6, 1990
U.S. Pat. No. 4,937,036
Patentee(s): Sandman Jr. et al.
Issued: Jun. 26, 1990
U.S. Pat. No. 4,939,507
Patentee(s): Beard et al.
Issued: Jul. 3, 1990
U.S. Pat. No. 4,947,345
Patentee(s): Paradise et al.
Issued: Aug. 7, 1990
U.S. Pat. No. 5,008,853
Patentee(s): Bly et al.
Issued: Apr. 16, 1991
U.S. Pat. No. 5,113,355
Patentee(s): Nomura
Issued: May 12, 1992
U.S. Pat. No. 5,065,347
Patentee(s): Pajak et al.
Issued: Nov. 12, 1991
U.S. Pat. No. 5,072,412
Patentee(s): Henderson Jr. et al.
Issued: Dec. 10, 1991
U.S. Pat. No. 5,113,517
Patentee(s): Beard et al.
Issued: May 12, 1992
U.S. Pat. No. 5,153,577
Patentee(s): Mackey et al.
Issued: Oct. 6, 1992

Pertinent portions of the above-cited references are incorporated by reference.

Other examples of printer controls include:

U.S. Pat. No. 5,133,048

Patentee(s): Parsons et al.

Issued: Jul. 21, 1992

U.S. Pat. No. 5,170,340

Patentee(s): Prokop et al.

Issued: Dec. 8, 1992

Now allowed U.S. patent application Ser. No. 07/591,324

Charles LeComte

"The Xerox DocuTech® Production Publisher"

BIS CAP International, Newtonville, Mass. October 1990

Pertinent portions of the above-cited references are incorporated by reference.

By way of further background, the concept of various scanned paper or electronic imaging transmission input devices selectably electronically interfaced or networked to a flexible modular printer has been disclosed in the following patents:

U.S. Pat. No. 3,597,071

Patentee(s) Burton

Issued: Jul. 27, 1971

U.S. Pat. No. 4,623,244

Patentee(s): Andrews et al.

Issued: Nov. 18, 1986

Pertinent portions of the above-cited references are incorporated by reference.

Xerox® Corporation presently is marketing a server for a printing apparatus, the server being referred to as the DocuTech® Manager Server ("DocuTech Manager Server" is a trademark of Xerox Corp.). This server is adapted to translate a job written in a first PDL, such as Postscript® ("PS") or Hewlett Packard Printer Control Language ("HP-PCL"), into a second PDL, such as Interpress, for printing of the job on a Xerox® compatible printing apparatus. At the heart of the server are two interpreters, one of which is adapted to translate PS and the other of which is adapted to translate HP-PCL. Each interpreter contains software, written by either Adobe® Systems Inc. or Peerless® Corp. to facilitate the translation process. Additionally, Eastman Kodak produces a network printing system, known as "LionHeart™", which employs a print server. Finally, the following reference is of interest in the network systems area:

Cheryl E. Currid and Craig A. Gillett

"Mastering Novell® Netware®" SYBEX, Inc., Alameda, Calif. 1990

A PDL is a method of describing printed page(s) in a printer independent format. A PDL establishes an interface between a print driver or client and a print server or printer. The following references are pertinent to the area of page description languages:

PostScript® Language Reference Manual Second Edition

Addison-Wesley Publishing Co. 1990

PCL 5 Printer Language

Technical Reference Manual First Edition

Hewlett Packard Co. 1990

Harrington, S. J. and Buckley, R. R.

Interpress: The Source Book Simon & Schuster, Inc. New York, N.Y. 1988

As is noted in art cited above, the control of, and software for, printers in a system or network environment can be in the printer itself. Commonly, however, a major part of the system printer integration software operation may be in the print server connected into the system, (typically a stand alone but dedicated small computer or PC). The server typically functions as a "spooler" to buffer the jobs that are sent to it, as well as a page description language (PDL) "decomposer", for converting the PDL files (e.g., "Interpress™" or "PostScript®") to bitmapped files for application to the printer.

Another example of an established commercial integral system, with a shared printer and system server, comprises the Xerox Corporation "VP Local Laser Printing" software application package, which, together with the Xerox "4045" (or other) Laser Copier/Printer (CP), the "6085" "Professional Computer System" using Xerox Corporation "ViewPoint" or "GlobalView®" software and a "local printer [print service] Option" kit, comprises the "Documenter" system. The laser printer prints text and graphics with high quality resolution on a variety of paper sizes and special papers, including transparencies, labels, and envelopes. Printing occurs as a background process, enabling system users to continue with other desktop activities at their terminals. VP Local Laser Printing software can be loaded at a networked, remote, or standalone Xerox "6085" Professional Computer System (workstation).

The even earlier Xerox Corporation "8000" "Xerox Network Services Product Descriptions" text further describes other commercially available Xerox Corporation electronic document printing systems. It notes that such document systems can support the capabilities of remote workstations, PC terminals, and facsimile devices, and connect them for shared use of an electronic printer, usually via a print server and/or shared user interface formatting print service. The software system can also control local print job queue management, etc. The print service will accept a print job from any device with access to the network which can be formatted or reformatted to the Xerox Interpress™ [or other such electronic printing standard or printing protocol]. It allows the client to submit a printing job, including an Interpress™ or other such standard master and a number of job parameters, such as paper size, number of copies, and device-specific information. The printing protocol also allows the client to query the print service regarding the status of the job, for user notification.

The electronic printing standard includes a specific set of instructions for printing in a standard for representing documents digitally. The Interpress™ standard for representing printed pages is supported by a wide range of Xerox® Corporation other products. The print service understands and processes Interpress™ instructions received from a workstation, transforming them into a format understood by the printer. The Interpress™ standard is comprehensive; it can represent any images that can be applied to paper (including complex graphics) and a wide variety of font styles and characters. Each page of an "Interpress™" master can be interpreted independently of others. This allows a user to easily produce new masters from existing ones and allows the printer to selectively print pages from any master it receives.

Although a "formatting print service" may not have a printer directly attached, it can perform much the same as a print service that does. The typical principal difference is the transferring of an Interpress™ master into an internal format understood by the printer. The formatting print service creates a secondary Interpress™ master which accurately represents the same image but in a subset of Interpress™ which can be directly processed by the designated or target printer. This secondary Interpress™ master is then transmitted to the formatting print service's target printer for processing and printing.

Workstations on the network with conversion software can interact with the print service. This software runs automatically when users request that a document be printed. It converts the document format used by the workstation into an Interpress™ master which is transmitted to the print service. This transfer is implemented by a network queuing subsystem which implements the printing protocol and interfaces with an internal print queue for the tracking of the Interpress™ master. The internal print queue facilitates the movement of documents through the various stages of processing. The queue can hold a large number of documents, which are processed in the order received, or can be reprioritized. Generally, a print job is available in the printer's output tray within minutes after the user initiates the print request. The user can see the status of a print job and its place in the queue by making a request through the print server terminal or at the workstation. The resulting display will tell the user whether the job is being queued, formatted or printed. Once the document has been printed, the print service can delete the Interpress™ master or save it for future demand printing.

The Interpress™ master is also accompanied by properties and options which specify document name, user name, and creation date. The print service interprets the master and then directs the printer during the printing process. This process involves several stages: queuing, formatting, and either printing, transmitting (in the case of facsimile print service) or forwarding to another print service (in the case of the formatting print service). During the printing or Fax transmission stage, messages may be generated to report any problems with the printer, such as a need to replenish the paper supply.

Different workstations can access the print service in different ways. To print a document, desirably the user can simply "copy" or "move" the document, with a mouse click or other command, to a printer icon on the workstation desktop, and set the displayed printing options, as on Xerox Corporation workstations. From other workstations, such as an IBM PC, the user may need to select menu items, or type in commands, to obtain access. The workstation selectable print options can include the number of copies, selected pages to be printed, paper size, image orientation, a choice of printers, and phone numbers when sending to a facsimile device. In addition, the option sheet allows the user to specify whether to delete the Interpress™ or other master, or retain it at the workstation desktop. Already print-formatted or master documents may be transmitted to the printer directly, eliminating the need to repeat the conversion or decomposition process if another copy of the document is desired. If saved, an Interpress™ master can be stored at the file service or even mailed to one or more individuals via an electronic mail service.

Utilizing an inter-network routing service, users can transmit Interpress™ or other printing masters through a network and then across an internet, typically, via telephone lines, twisted pair wires, coaxial cables, microwaves, infrared, and/or other data links, allowing documents created in one location to be automatically routed to a print service and printer hundreds or even thousands of miles away, in seconds or minutes.

As explained above, the DocuTech Network Server is capable of converting an image data file from one page description language into another page description language prior to printing of the image data file. In those circumstances where significant error arises in the conversion process, the resulting prints generated from the converted image data file are undesirable. On the other hand, undesirable prints can be obtained at the printer even when the conversion process is performed with little or no error. It would be desirable to provide a technique, for a network printing system, which serves to determine the source of error resulting in unacceptable print quality, i.e. a technique for verifying the integrity of various subsystems of the network printing system.

In accordance with the present invention there is provided an apparatus for verifying the integrity of a printing system, including: an interpreter for converting an input image data file written in a first page description language into an output image data file written in a second page description language; and a comparator for comparing the output image data file with a reference output image data file.

In another aspect of the disclosed invention there is provided another apparatus for verifying the integrity of the printing system, including: an interpreter for converting an input image data file written in a first page description language into an output image data file written in a second page description language; and a printer for producing a print from the output image data file, the print including a first portion and a second portion with a first type of information and a second type of information being printed thereon, respectively, the quality of printing by the printer being determined by comparing the first type of information to the second type of information.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
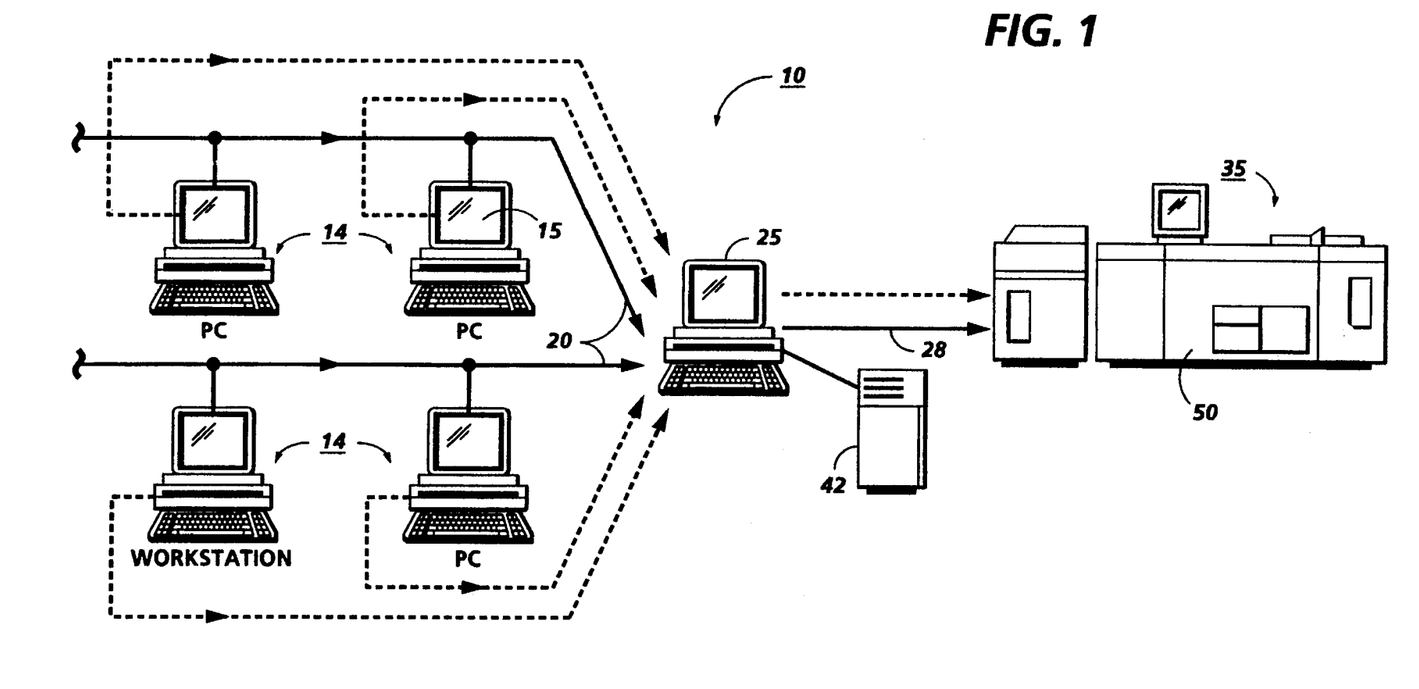
FIG. 1 is a schematic view of a printing arrangement including a plurality of client workstations interfaced with a printing apparatus by a server.

Referring to FIG. 1, there is shown a printing arrangement, designated generally by the numeral 10. The printing arrangement 10 includes a plurality of remote inputs such as PCs, workstations, etc. (referred to herein as workstations 14), coupled via one or more networks 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35. While separate networks 20, 28 are shown, a single network may instead be used.

Figure 2:
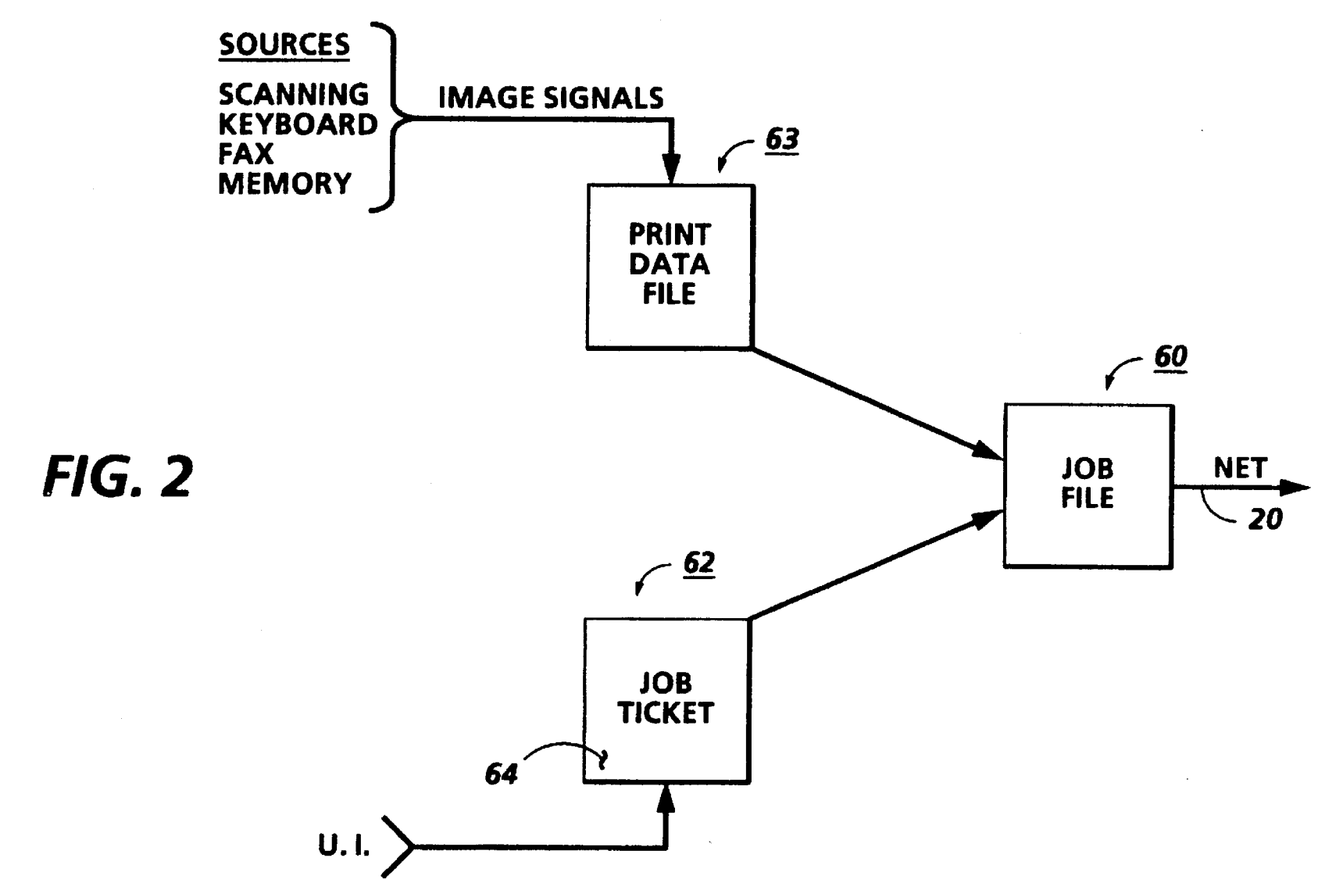
FIG. 2 is a schematic, elevational view of a job file and the contents thereof.

Referring to FIG. 2, electronic job files 60, or parts thereof, are created at the individual workstations 14, each job file being comprised of a Job Specification 62 and Print Data file 63 expressed in a PDL. Job Specification 62 is in the form of a job ticket 64 having instructions for routing, handling, and processing the job 62. As will be clarified from the discussion below, in the preferred embodiment of the present invention, the PDL of print data file 63 is either written in Postscript® ("PS") or Hewlett Packard Printer Control Language ("HP-PCL"). The jobs in Print Data file 63 are electronic in form, consisting of image signals or pixels generated, for example, by scanning hard copy documents and converting the document images to image signals (data) or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels or PDL instructions in Print Data File 63 are arranged as electronic documents or pages for printing on a print media such as paper stock or sheets.

The programming instructions in the job ticket 64 accompanying the job file 60 may include selection of the printer in the case where plural printers are available for the client or user to choose from in printing system 35. Where a printing system 35 has printers with different features, functions, speeds, etc., it may be necessary that the client select the printer that is to be used initially so that a job ticket 64 with the program selections available with that printer may be displayed at the client's workstation 14 as described more fully in U.S. patent application Ser. No. 07/752,155, filed Aug. 29, 1991, entitled "Dialog Filtering," the pertinent portions of which are incorporated herein. During the printing process, the server 25 transmits the printing instructions from the job ticket 64 to the printing system selected.

Figure 3:
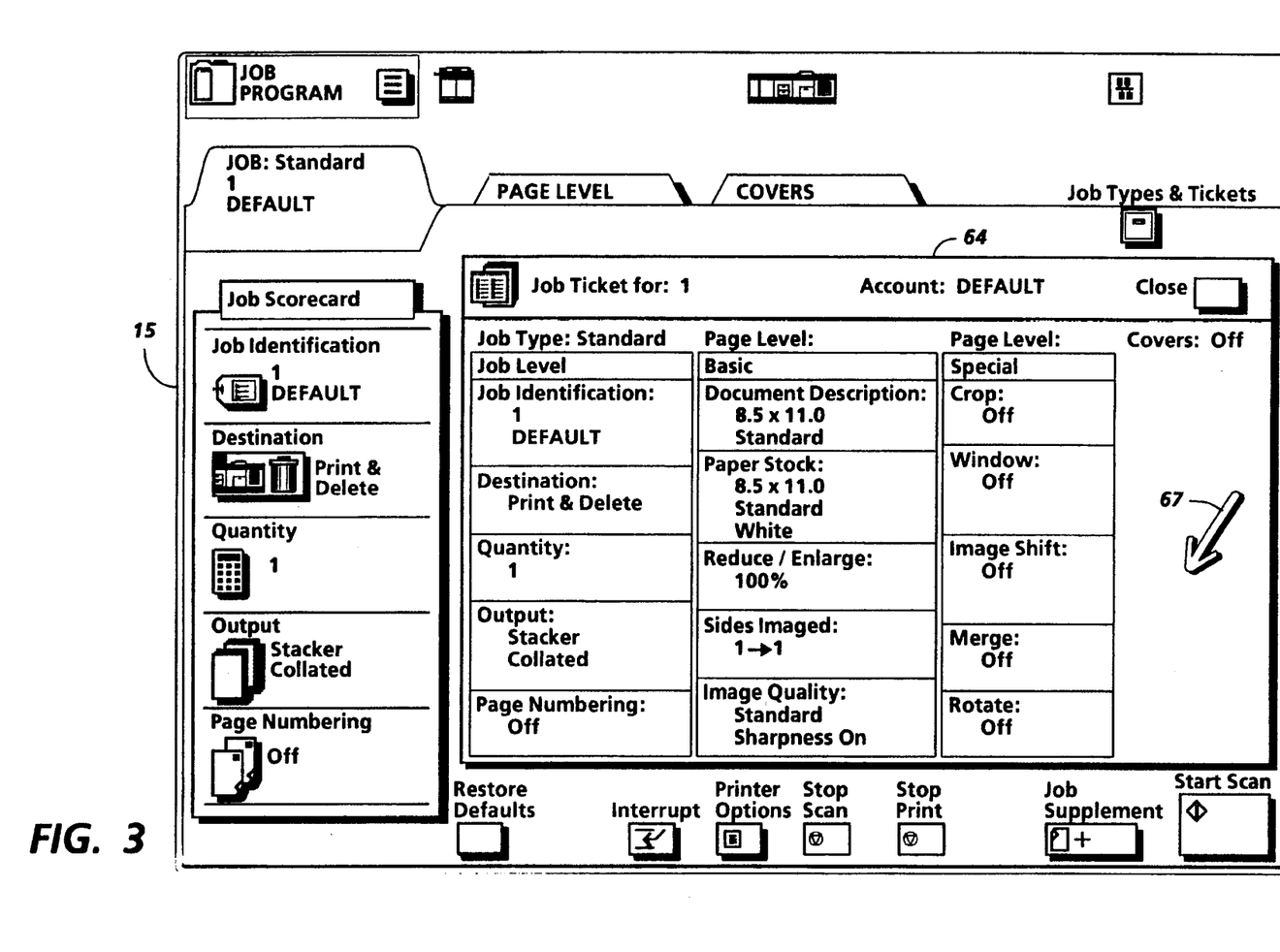
FIG. 3 is a schematic, elevational view of an exemplary job ticket.

A job ticket 64 comprises a series of electronic program instructions for processing a job. Normally, job ticket 64 consists of an electronic format (an example of which is shown in FIG. 3) having various programming choices displayed on screen 15 of the workstation 14 being used to create the job. The client at the workstation interactively fills out the job ticket by making selections electronically using the workstation mouse, keyboard, etc. It should be recognized that the job ticket instructions encompass not only print programming instructions for the job itself but also routing and handling instructions for the server 25. The completed job ticket 64 is combined with the job in Print Data file 63 in the job file 60.

The server 25 comprises any suitable interface for receiving job files 60 from workstations via network 20, with the ability to access and decode the job processing instructions on the accompanying job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 (FIG. 1) may be provided for this purpose.

The printing system 35 (FIG. 1) may include one or more high speed electronic printers 50 for processing jobs in accordance with the instructions input through the job ticket accompanying each job file. While a single printer 50 is shown, plural printers, either at a single central location or at several remote locations may be envisioned. Printer 50, for example, may be a xerographic based printer of the type shown and described in U.S. Pat. No. 5,170,340 to Prokop et al., the pertinent portions of which are incorporated herein. In other contemplated implementations of the preferred embodiment, the printer 50 could comprise other known printer types such as ink jet, ionographic, LED, and the like.

Referring to FIG. 40 the printing arrangement 10 is shown in further detail. In the illustrated example of FIG. 4, the printing arrangement 10 includes one of the workstations 14, the server 25 and the printing system 35. More particularly, the server 25 includes a host processor 102, a coprocessor 104 and a storage area 106. The host processor 102, which coordinates the input of print jobs to the coprocessor 104, includes a comparator 108 for comparing image data of image data files. The coprocessor includes an interpreter 110, which interpreter is capable of interpreting jobs that are written in Postscript or HP-PCL and converting them into an Interpress file. A detailed description of the interpreter 110 can be found in now allowed U.S. patent application Ser. No. 07/898,045, entitled "Method for Translating a Plurality of Printer Page Description Languages", filed Jun. 12, 1992, by Mensing et al., the pertinent portions of which are incorporated herein. The host processor 102 is further coupled with a user interface 112, the user interface including a conventional CRT with a screen for displaying messages generated by the host processor.

Figure 4:
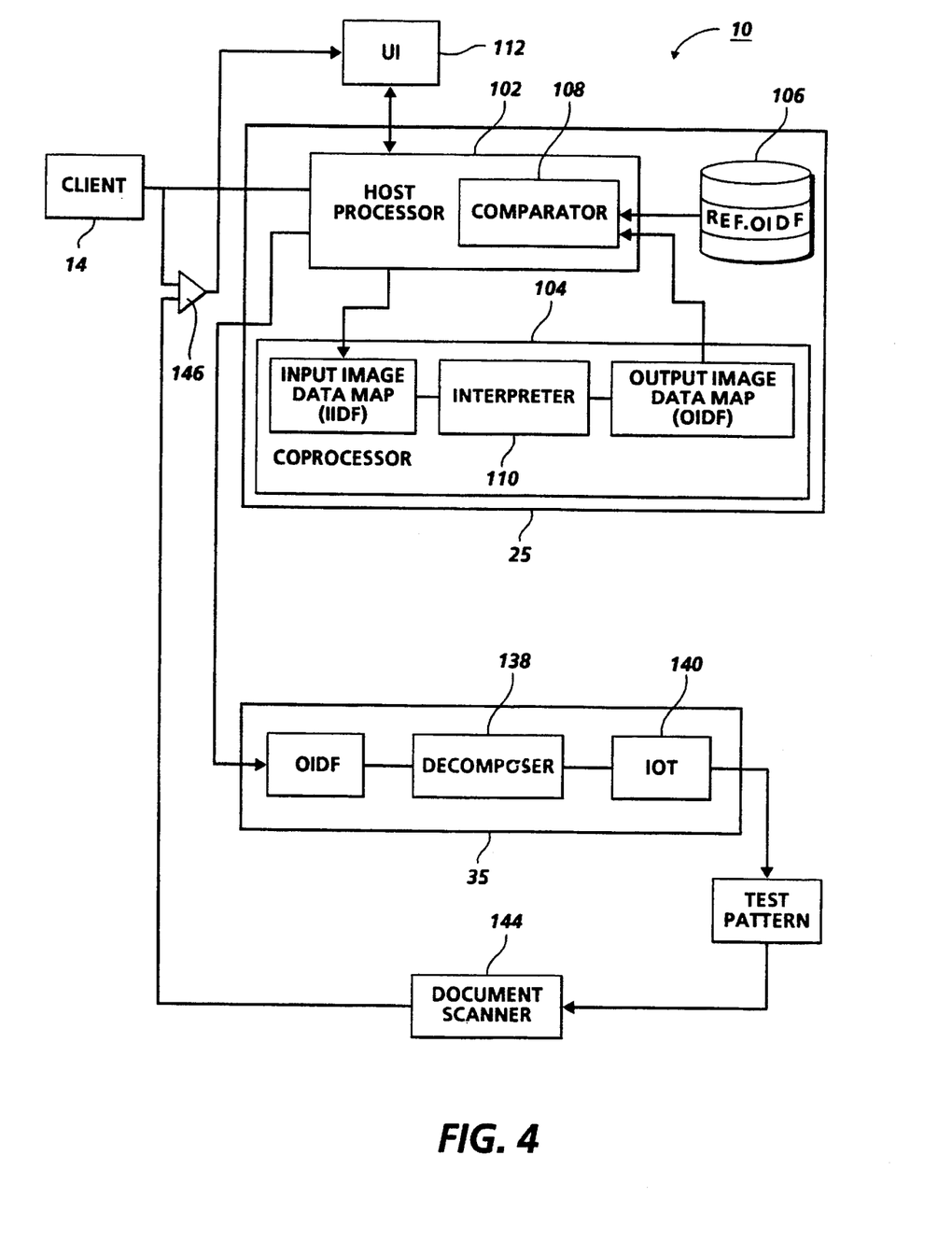
FIG. 4 is a block diagram illustrating the printing arrangement of FIG. 1 in further detail.
Figure 5:
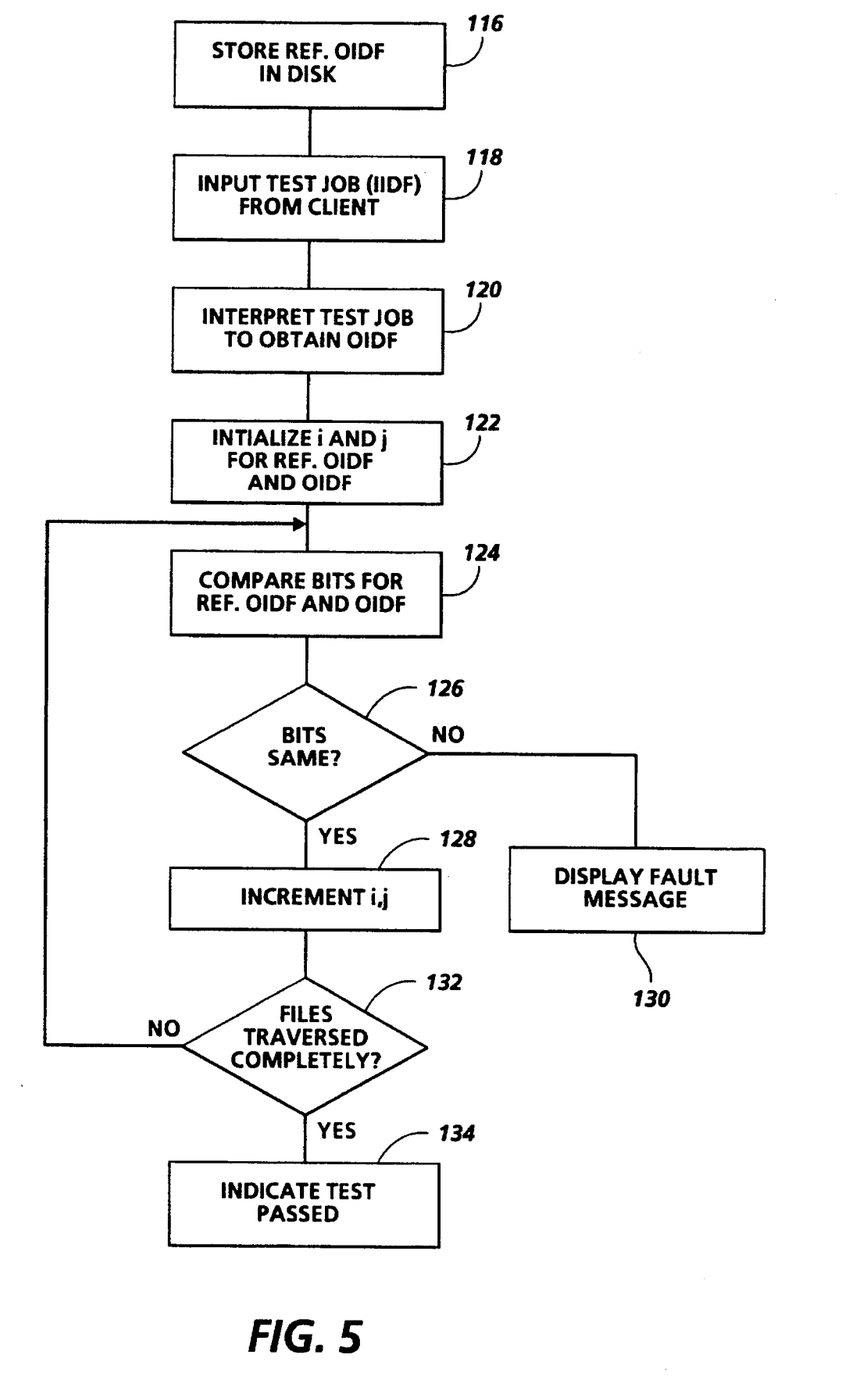
FIG. 5 is a flow diagram illustrating the manner in which an electronic test pattern (i.e. an input image data file) is processed to verify the integrity of an interpreter.

Referring to FIG. 5, an approach for verifying the operation of the interpreter 110 is shown. In one example, an electronic representation of a test pattern, namely an input image data file ("IIDF") is stored in one of the illustrated client workstation 14 or the server 25. As indicated in FIG. 5, at step 116, a reference output image data file ("REF.OIDF") is maintained in the storage section 106. As should be appreciated, the REF.OIDF corresponds substantially with the output that would be obtained for a corresponding IIDF if it were interpreted with little or no error. At steps 118, 120, the IIDF (also referred to as "TEST JOB")

is inputted to the interpreter 110 for conversion into an output image data file ("OIDF"). As discussed in U.S. patent application Ser. No. 07/898,045, the purpose of the interpreter 110 is to convert a file written in a first PDL to a file written in a second PDL. The converted test pattern, namely the OIDF is inputted to the comparator 108 where, through one exemplary approach (steps 122, 124, 126 and 128) the OIDF is compared with the REF.OIDF. In the exemplary approach of FIG. 5, each bit (represented by coordinates "i,j") of the OIDF is compared with a corresponding bit of the REF.OIDF. When one or more bits of the OIDF differ from one or more corresponding bits of the REF.OIDF, a fault message is displayed, at step 130, on the UI 112 (FIG. 4). Once the files have been compared completely (step 132) a "TEST PASSED" indication is provided at step 134.

In the above-described embodiment, the OIDF is shown as being compared to the REF.OIDF at the server 25. In an equally preferred embodiment, the client 14 would be provided with a compare utility (not shown) and the REF.OIDF would be stored at the client 14. In this embodiment, the OIDF would be transmitted from the server 25 to the client 14 where the OIDF and the REF.OIDF would be compared to one another with the compare utility. For those situations in which the OIDF and the REF.OIDF did not correspond, a fault message would be displayed on the screen 15 (FIG. 1) of the client 14.

Additionally, while the comparison between OIDF and the REF.OIDF is shown as being bit-by-bit (or byte-by-byte) other comparison approaches could be employed, instead of bit-by-bit, without changing the concept upon which the disclosed embodiment is based. For example, comparison of the OIDF and the REF.OIDF could be performed with autocorrelation in which percentages of bit patterns are compared with one another.

The test pattern can be used to verify the operation of other parts of the printing arrangement 10. In one example, a suitable interpreted OIDF can be used to verify the operation of the printer. Referring again to FIG. 4, the printer 35 includes a decomposer 138 and an image output terminal ("IOT") 140. The decomposer 138 can be of the type used in a Xerox® 4045 ("Xerox 4045" is a trademark used by Xerox® Corp.) printer. Additionally, the IOT can be a suitable print engine of the type shown in U.S. Pat. No. 5,170,340 to Prokop et al. In operation of the printer 35, the suitably interpreted OIDF is transmitted to the decomposer 138 where it is decomposed into graphics and text for printing by the IOT 140. It will be appreciated that the veracity of decomposition can confirmed by comparing a file of the decomposed OIDF with an appropriate reference file in a manner similar to that described above.

Figure 6:
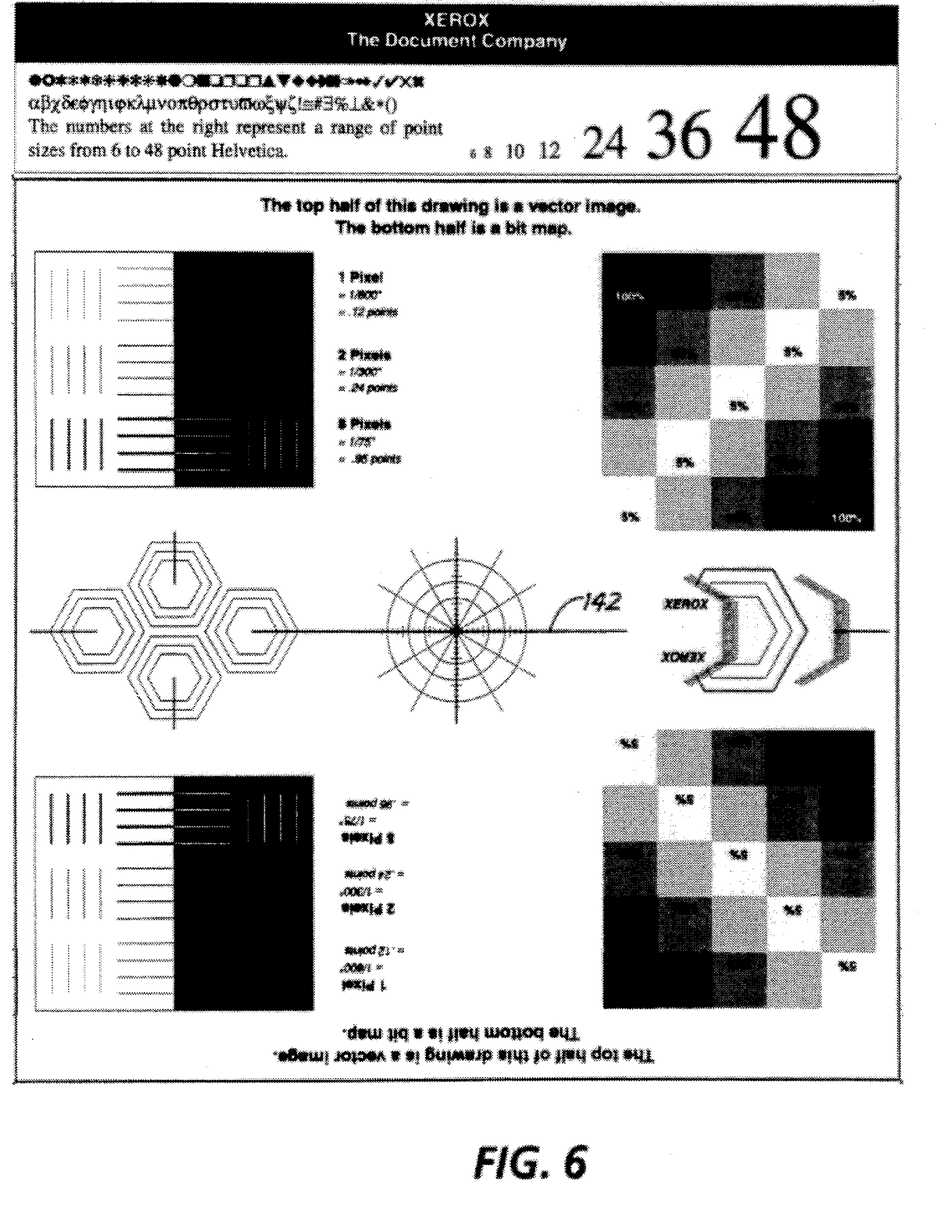
FIG. 6 is a plan view of a test pattern print used to verify the integrity of a printer of the printing arrangement.

Referring to FIGS. 4 and 6, a test pattern print can be produced to verify the integrity of the printer 35. Referring specifically to FIG. 6, a test pattern print, which includes a vector graphics portion and a bitmap portion is shown. That is, one portion includes an image generated with vector graphics, while the other portion includes an image generated from bitmaps. As is known, vector graphics are line drawings generated with instructions while bitmaps are patterns of individual pixels or dots. Preferably, when the server and the printer are operating within specified tolerances, the bitmap portion of the print will align with the vector graphics portion of the print when the print is folded about a central foldline 142. In practice, the test pattern print includes representations of image components besides bitmap representations and vector graphic representations. For example, the test pattern typically includes a portion for printing of text.

Referring again to FIG. 4, further testing of system integrity may be performed through use of a document scanner 144 and a comparator 146. In particular, the test pattern print can be scanned with the document scanner 144 and the resulting stream of bits can be transmitted to the comparator 146 for comparison with a corresponding stream of bits emitted from the client 14. In other words, an electronic test pattern residing in the client (i.e., an IIDF) can be compared to the output of the printing arrangement 10 to gage the integrity of the printing printer 35. Alternatively, assuming that the printed test pattern can serve as a standard of print performance, the image data of the scanned test pattern print can be used as a reference by which to verify the emission of the workstation 14.

Numerous features of the presently disclosed embodiment will be appreciated by those skilled in the art. In particular, a technique, which can be used to verify the integrity of a network printing arrangement at various levels, has been disclosed. In one example, an input image data file can be interpreted at a server and the integrity of the interpretation process can be verified by comparing an output image data file with a reference output image data file. In another example, a suitable output image data file can be sent along to a printer and the integrity of the printing process can be verified through use of a test pattern print. In yet another example, the test pattern print can be scanned and compared with an input image data file emitted by a client workstation.

What is claimed is:

1. In a printing system for processing a print job including an input image data file written in a page description language, the input image data file including image data and instructions directing the printing system in a manner of producing an electronic page including a first image based on the image data, a diagnostic system for diagnosing a capability of the printing system to interpret the input image data file within an acceptable degree of accuracy, comprising:

an interpreter for interpreting the input image data file so as to obtain a first output including the first image based on image data corresponding with the first image;

a memory for storing a reference output image data file corresponding substantially with a second output including a second image, the second output representing an ideal output that would be obtained as a result of interpreting the input image data file within the acceptable degree of accuracy; and a comparator for comparing a substantial portion of the first image of the first output with a substantial portion of the second image of the second output to determine whether the input image data file has been interpreted within the acceptable degree of accuracy, a user of the printing system being provided with an indication, at an output device, as to whether the input image data file has been interpreted within the acceptable degree of accuracy so that an interaction between the user of the printing system and the printing system, with respect to interpretation accuracy, is obtained.

2. The diagnostic system of claim 1, further comprising a print server, wherein said print server includes said interpreter and said comparator.

3. The diagnostic system of claim 1, wherein said printing system includes a a print engine for producing a print representative of the image of the first output.

4. The diagnostic system of claim 3, wherein the print is scanned to produce an electronic document of the print.

5. The diagnostic system of claim 4, further comprising a workstation for inputting the input image data file to said interpreter.

6. The diagnostic system of claim 5, wherein the electronic document is compared with the input image data file from said workstation.

7. The diagnostic system of claim 6, wherein said workstation, in response to the image data of the input image data file being different from the image data of the electronic document, generates a fault message.

8. In a printing system for processing a print job including an input image data file written in a page description language, the input image data file including image data and instructions directing the printing system in a manner of producing an electronic page including a first image based on the image data, a method for diagnosing a capability of the printing system to interpret the input image data file within an acceptable degree of accuracy, comprising:

interpreting the input image data file so as to obtain a first output including the first image based on image data corresponding with the first image;

storing a reference output image data file corresponding substantially with a second output including a second image, the second output representing an ideal output that would be obtained as a result of interpreting the input image data file within the acceptable degree of accuracy; and     comparing a substantial portion of the first image of the first output with a substantial portion of the second image of the second output to determine whether the input image data file has been interpreted within the acceptable degree of accuracy, a user of the printing system being provided with an indication, at an output device, as to whether the input image data file has been interpreted within the acceptable degree of accuracy so that an interaction between the user of the printing system and the printing system, with respect to interpretation accuracy, is obtained.

* * * * *